July 21, 1925.
W. H. ALLEN
1,546,357
PROCESS OF APPLYING LIQUID COATINGS
Filed Aug. 6, 1924
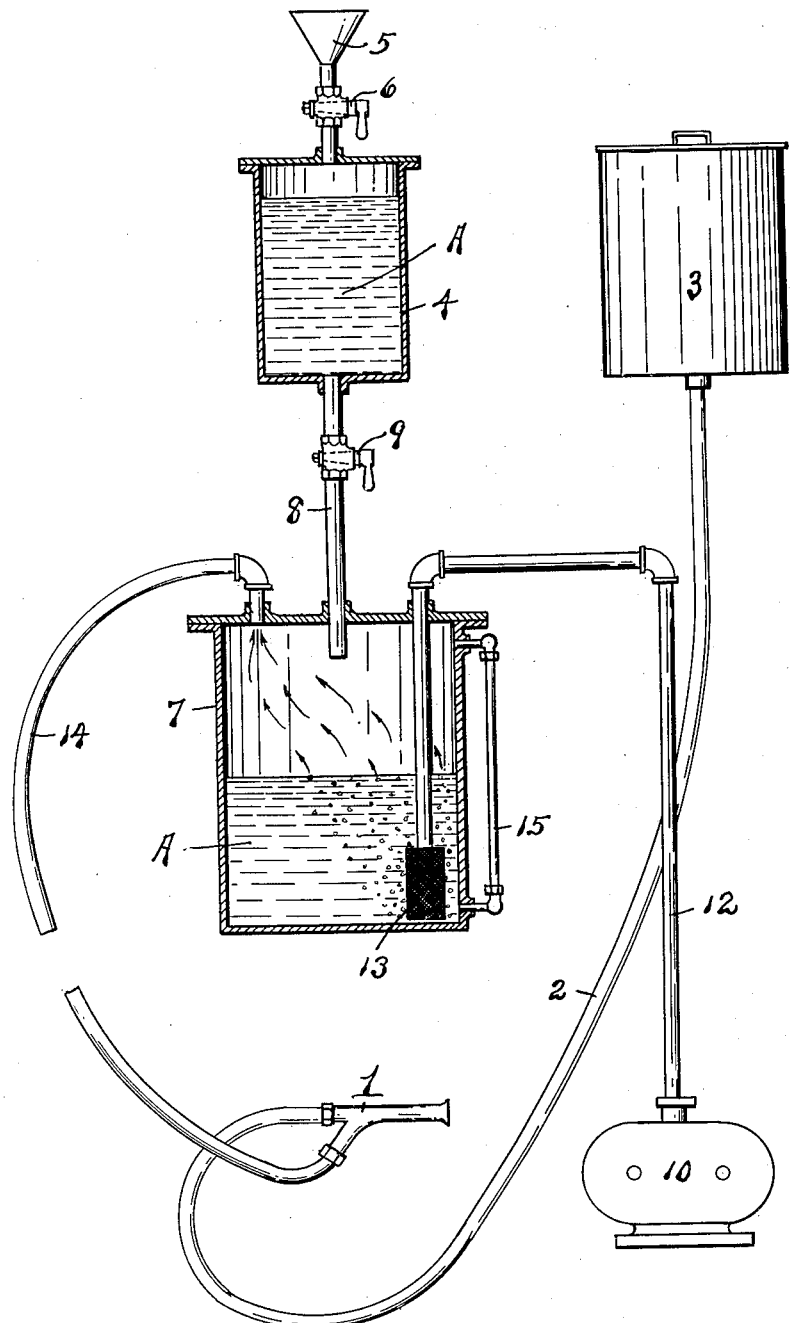
INVENTOR
William H. Allen
BY
Edward N. Pagelsen
ATTORNEY Patented July 21, 1925.

1,546,357

UNITED STATES PATENT OFFICE.

WILLIAM H. ALLEN, OF DETROIT, MICHIGAN.

PROCESS OF APPLYING LIQUID COATINGS.

Application filed August 6, 1924. Serial No. 730,376.

*To all whom it may concern:*

Be it known that I, WILLIAM H. ALLEN, a citizen of the United States, and residing at Detroit, in the county of Wayne and State of Michigan, have invented a new and Improved Process of Applying Liquid Coatings, of which the following is a specification.

This invention relates to the application by spraying of lacquers, varnishes and other coatings which employ volatile solvents, and its object is to obviate the pebbly or uneven conditions of the resulting surfaces after the coating has dried, which unevenness necessitates expensive rubbing-down and polishing to produce the desired glossy surface.

When liquid lacquers, varnishes and similar coatings are sprayed upon the surfaces to be finished, a blast or constricted current of air carries fine particles of the liquid to the place where the coating is to be applied. The liquid is usually made up of nitrocellulose or other derivative of cellulose, gums, or natural or synthetic resinous compounds, or mixtures thereof, used in making up varnishes and lacquers. These are dissolved in any of the volatile "thinners" such as ethyl, methyl, butyl and amyl alcohols or their derivatives, ketones, etc., neither the bases nor the solvents forming any part of this invention. Portions of the volatile solvents in some of these particles of liquid are taken up by the air of the air blast, which causes some of these particles to become partly dried out, so that when they impinge on the surfaces to be coated these particles do not flatten properly as do those particles which are in a more liquid state. The result is an uneven pebbly surface which must be rubbed down and polished to produce the desired glossy surface.

I have found that when the air employed to produce a spray of this character is first saturated with the vapor of the solvent or the "thinner" as it is termed in the trade, this uneven evaporation of the particles of the coating liquid does not take place and the particles of the liquid as they impinge upon the surface to be covered unite in a smooth coating of substantially even thickness and with a substantially flat and glossy surface which can be readily polished, the pebbly effect being reduced to a minimum.

The saturation of the air with the solvent may be accomplished in any desired manner, either before or after the air is compressed, as by passing it through the solvent in proper containers or through sprays of the solvent.

It is not actually necessary that the solvent of the coating liquid should be employed to saturate the air of the blast as any other volatile material may be employed which will be neutral to the solvent of the coating material, that is, will not affect it, and which will so saturate the air that it will not take up any substantial amount of the solvent of the lacquer or varnish.

The accompanying drawing illustrates means for carrying out this invention. The air brush 1 has a flexible hose 2 connecting it to the tank 3 which holds the coating to be sprayed. A reservoir 4 for the liquid A with which the air is to be saturated is provided with a funnel 5 and a stop-cock 6 may be used to cut off the funnel from the container. A container 7 receives this liquid from the reservoir 4 by means of a pipe 8 which is also provided with a stop cock 9. The air forced by the blower 10 through the pipe 12 passes through the strainer 13 which breaks it up into small bubbles and these, in passing up through the liquid A are saturated therewith before passing out of the container and through the flexible tube 14 to the air brush 1. The depth of the liquid in the container 7 can be determined by the glass tube 15. The reservoir 4 may be replenished through the funnel 5, after which the stop-cock 6 is closed and the container 7 may then be refilled by opening the stop-cock 9 without stopping the operation of the device.

The details of this mechanism may all be changed by those skilled in the art without departing from the spirit of my invention as set forth in the following claims.

I claim:—

1. The process of applying liquid coatings by spraying, which consists in saturating the air employed in the spraying with a solvent material before bringing the air into contact with the liquid to be sprayed, then mixing the air with the liquid to be sprayed, and applying the coating.

2. The process of applying liquid lacquer, varnish and similar coatings by spraying, which consists in saturating air with a volatile material before bringing the air into contact with the liquid to be sprayed so that said air will not take up any substantial amount of said solvent from the particles of the liquid to be sprayed, then mixing the air with the liquid to be applied, and then applying the liquid to the surface to be coated.

WILLIAM H. ALLEN.